(12) United States Patent
Lai et al.

(10) Patent No.: US 12,111,670 B2
(45) Date of Patent: Oct. 8, 2024

(54) DISPLAY DEVICE

(71) Applicant: Shanghai Tianma Micro-Electronics Co., Ltd., Shanghai (CN)

(72) Inventors: Xiaoyan Lai, Shanghai (CN); Huiqiang Song, Shanghai (CN); Zhiyi Hong, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 572 days.

(21) Appl. No.: 17/411,300

(22) Filed: Aug. 25, 2021

(65) Prior Publication Data
US 2021/0382526 A1    Dec. 9, 2021

(30) Foreign Application Priority Data

May 16, 2021    (CN) .......................... 202110531208.6

(51) Int. Cl.
| | | |
|---|---|---|
| *H02K 21/16* | (2006.01) | |
| *G05D 3/20* | (2006.01) | |
| *G06F 1/16* | (2006.01) | |
| *G09F 9/30* | (2006.01) | |
| *G09F 9/37* | (2006.01) | |
| *H02K 11/01* | (2016.01) | |

(52) U.S. Cl.
CPC ............. *G05D 3/20* (2013.01); *G06F 1/1652* (2013.01); *G09F 9/301* (2013.01); *G09F 9/372* (2013.01); *G09F 9/375* (2013.01)

(58) Field of Classification Search
CPC .................................. H02P 31/00; H02P 1/16
See application file for complete search history.

(56) References Cited

U.S. PATENT DOCUMENTS

| | | | | |
|---|---|---|---|---|
| 4,512,010 | A  * | 4/1985 | Yamada | .................. G11B 21/04 |
| 2021/0120111 | A1* | 4/2021 | Choi | ...................... G06F 1/1624 |
| 2021/0124400 | A1* | 4/2021 | Pyo | ........................ G06F 1/1652 |
| 2023/0122508 | A1* | 4/2023 | Kim | ........................ G06F 1/206 |
| | | | | 318/558 |

FOREIGN PATENT DOCUMENTS

| | | |
|---|---|---|
| CN | 106157816 B | 11/2017 |
| CN | 111596727 A | 8/2020 |
| CN | 111681562 A | 9/2020 |
| CN | 112272248 A | 1/2021 |

* cited by examiner

*Primary Examiner* — Kawing Chan
*Assistant Examiner* — Charles S Laughlin
(74) *Attorney, Agent, or Firm* — KDW Firm PLLC

(57) ABSTRACT

Provided is a display device. The display device includes: a display panel; a motor-driven module, which is configured to be connected to the display panel and drive the display panel to move; a control module, which is configured to control the motor-driven module; a first module and a second module disposed opposite to each other in a first direction, where the first module and the second module are able to move relatively in a second direction; a first unit, which is disposed on a side of the first module facing the second module; a second unit, which is disposed on a side of the second module facing the first module; and in response to a position relationship between the first unit and the second unit, providing, by the control module, a first control signal for the motor-driven module, where the first direction intersects the second direction.

17 Claims, 8 Drawing Sheets

DISPLAY DEVICE

CROSS-REFERENCE TO RELATED APPLICATION(S)

This application claims priority to Chinese Patent Application No. 202110531208.6 filed May 16, 2021, the disclosure of which is incorporated herein by reference in its entirety.

TECHNICAL FIELD

Embodiments of the present disclosure relate to display techniques and, in particular, to a display device.

BACKGROUND

With the continuous development of science and technology, various mobile terminals such as mobile phones and tablet computers have emerged in endlessly, and more and more mobile terminals enter people's daily life. With the continuous improvement of users' needs, the structure, appearance, performance and other aspects of various mobile terminals are updated increasingly frequently.

To carry mobile display devices more conveniently and get better viewing experience, screens of some display devices will be designed with a retractable structure. How to improve the display devices has become an urgent problem to be solved.

SUMMARY

The present disclosure provides a display device to accurately control the movement position of the display panel during the movement process, which prevents the display panel from excessive movement and implements the effective and accurate driving of a motor-driven module to the display panel.

An embodiment of the present disclosure provides a display device. The display device includes a display panel, a motor-driven module, a control module, a first module and a second module, a first unit and a second unit.

The motor-driven module is configured to be connected to the display panel and drive the display panel to move.

The control module is configured to control the motor-driven module.

The first module and the second module are disposed opposite to each other in a first direction, and the first module and the second module are able to move relatively in a second direction.

The first unit is disposed on a side of the first module facing the second module.

The second unit is disposed on a side of the second module facing the first module.

In response to a position relationship between the first unit and the second unit, the control module provides a first control signal for the motor-driven module.

The first direction intersects the second direction.

In the embodiments of the present disclosure, the display device is configured to include the display panel, the motor-driven module, the control module, the first module and the second module which are disposed opposite to each other in the first direction. The first module and the second module are able to move relatively in the second direction. In addition, the first unit is disposed on the side of the first module facing the second module. In response to the position relationship between the first unit and the second unit, the control module provides the first control signal for the motor-driven module to control the movement of the display panel, so that the real-time monitoring of the movement state of the display panel can be implemented by using the first unit and the second unit, thereby feedbacking and controlling the movement situation of the display panel, making the movement control of the display panel more accurate, and avoiding the damage to the screen or the driving mechanism caused by the excessive movement. In response to a position relationship between the first unit and the second unit, the control module provides a first control signal for the motor-driven module.

DETAILED DESCRIPTION

Figure 1:
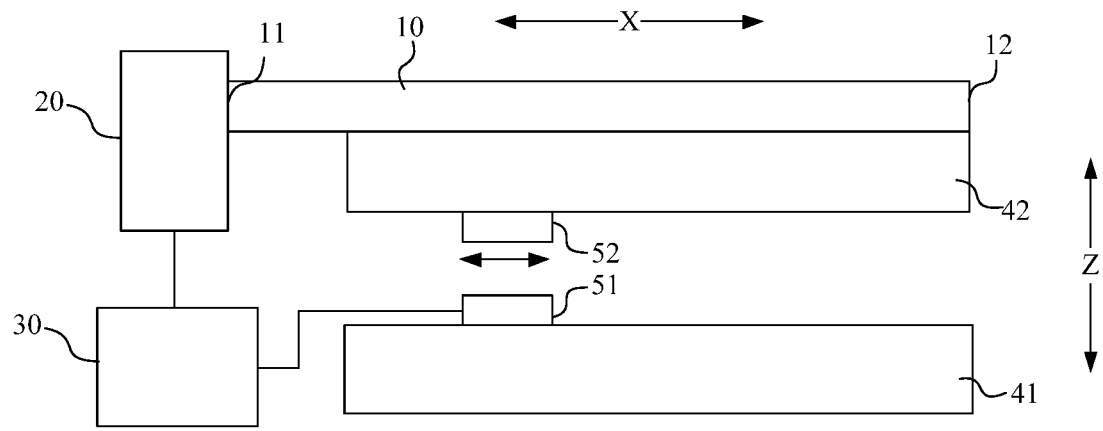
FIG. 1 is a structure diagram of a display device according to an embodiment of the present disclosure.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

To improve the display device, the inventors have found that in a case where the stretching and shrinking of the screen are driven by a driving mechanism, if the screen fails to stop accurately at a limit position, it is easy to cause damage to the screen and the driving mechanism.

During the research process, the inventors tried a scheme a in which: "the processor counts the number of turns rotated by the motor and the motor starts and stops when reaches a predetermined value". However, it is found that this method is implemented by counting, which requires high assembly accuracy and is difficulty to implement the accurate positioning. The inventors also studied and tried a scheme b in which: "a mechanical detent is provided, and the motor stops after the processor monitors that the motor current exceeds the predetermined value". However, the inventors' research result shows that determining the starting and stopping through the motor current leads to a long-term overload of the motor, which affects the lifetime of the motor. The inventors also studied and tried a scheme c in which: "an infrared sensor is used, when the mechanism moves to a specific position, the sensor is triggered, and the processor controls the motor to start and stop after the receiving is interrupted". However, the inventors' research result shows that in this scheme, the cost is high and the volume is large, which is not suitable for the narrow space of the mobile phone.

In summary, according to the research results of the inventors, the mobile phone has an assembly tolerance and the motor has a minimum rotation angle, so that the ideal accuracy cannot be achieved in the scheme a. If the motor suffers the long-term overload, the lifetime of the motor is affected, so that the stability is affected in the scheme b. In the scheme c, due to the large modules, the infrared sensor is often used for limiting the movement platform, which is difficult for miniaturization.

In the present disclosure, the first unit and the second unit are used for monitoring the movement state of the display panel in real time, thereby feedbacking and controlling the movement situation of the display panel, making the movement control of the display panel more accurate, and avoiding the damage to the screen or the driving mechanism caused by the excessive movement.

Figure 2:
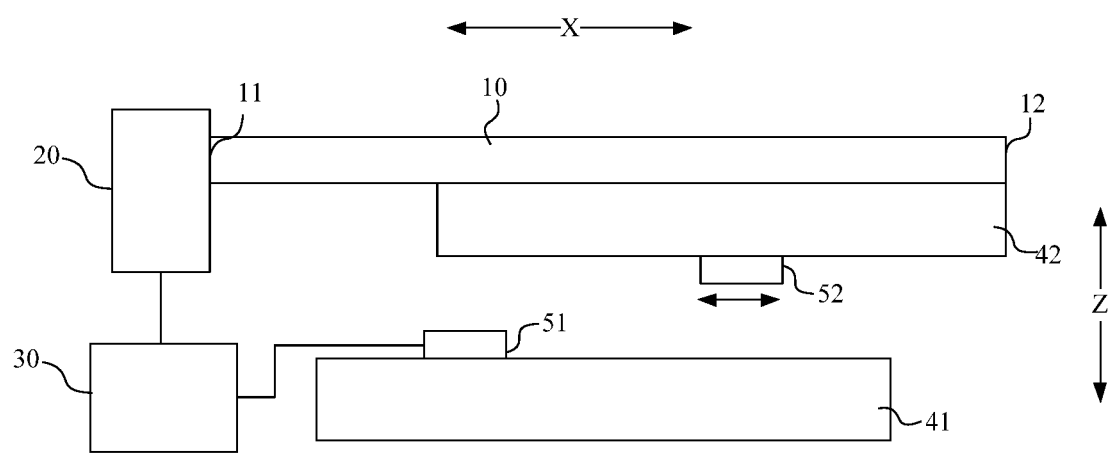
FIG. 2 is a structure diagram of another state of the display device shown in FIG. 1.

FIG. 1 is a structure diagram of a display device according to an embodiment of the present disclosure. FIG. 2 is a structure diagram of another state of the display device shown in FIG. 1. It can be understood that the structure diagram in this embodiment is a cross-sectional view, and the cross-sectional view is a sectional view perpendicular to a plane direction where the display panel is located.

Referring to FIGS. 1 and 2, the display device includes a display panel 10; a motor-driven module 20, which is configured to be connected to the display panel 10 and drive the display panel 10 to move; a control module 30, which is configured to control the motor-driven module 20; a first module 41 and a second module 42 disposed opposite to each other in a first direction Z, where the first module 41 and the second module 42 are able to move relatively in a second direction X; a first unit 51, which is disposed on a side of the first module 41 facing the second module 42; a second unit 52, which is disposed on a side of the second module 42 facing the first module 41; and in response to a position relationship between the first unit 51 and the second unit 52, providing, by the control module 30, a first control signal for the motor-driven module 20, where the first direction Z intersects the second direction X. In an embodiment, the display panel in the present application is a flexible display panel. Specifically, the display panel 10 may use a liquid crystal display panel or an organic light-emitting display panel.

First, the display device is essentially a display device capable of changing the display area or the overall size, thereby adapting to different display requirements and storage requirements of users. It is to be understood that the adjustment of the display area or the overall size requires the cooperation of the corresponding motor-driven mechanism and mechanical mechanism. In this embodiment, specifically, the motor-driven module 20 is configured as a motor-driven mechanism, which is responsible for driving the display panel 10 to move, so that the display panel 10 can be stretched or winded-up in the second direction X, thereby implementing the change of the screen size.

In an embodiment, at least part of the display panel 10 is flattened on a plane parallel to the second direction X and perpendicular to the first direction Z, thereby providing a flat display surface for the users to view. According to the users' requirements, the other part that does not need to be viewed may be bent or winded, and a direction of winding or bending faces a back of the display panel (a non-display surface).

In an embodiment, the first module 41 and the second module 42, serving as corresponding mechanical structures, are configured to be responsible for cooperation to implement the movement of the display panel 10. The two modules are disposed opposite to each other in the first direction Z (e.g., a longitudinal direction shown in FIG. 1), meanwhile, the two modules are disposed opposite to each other in the second direction X (e.g., a horizontal direction shown in FIG. 1). Here, the first module 41 and the second module 42 moving relatively in the second direction 2 means that the second module 42 may move in the second direction 2 facing or facing away from the first module 41. In addition, it is to be noted that in this embodiment, the first direction Z is perpendicular to the second direction X, and in other embodiments of the present disclosure, the first direction Z intersects the second direction X.

In an embodiment, the first direction X is parallel to a plane where the stretched part of the display panel 10 is located.

In this embodiment, a first unit 51 is disposed on a side of the first module 41 facing the second module 42, meanwhile, a second unit 52 is disposed on a side of the second module 42 facing the first module 41, in essence, a relative position change of the first module 41 and the second module 42 is obtained by using a relative position change of the first unit 51 and the second unit 52, that is, the relative position of the first module 41 and the second module 42 may be monitored by the relative position change of the first unit 51 and the second unit 52. The control module 30 senses the position relationship between the first unit 51 and the second unit 52, thus further providing feedback and control for the mobile module 20. After receiving the feedback and control, the motor-driven module 20 drives the display panel 10 to move, that is, the relative position relationship between the two units (or two modules) affects a winded-up state of the display panel. Therefore, a state of the display panel 10 is monitored during the movement.

The display device includes a first state and a second state. As shown in FIG. 1, in the first state, the first unit 51 and the second unit 52 overlap in the first direction Z, and the control module 30 outputs a first control signal to the motor-driven module 20 so that the motor-driven module 20 shuts down the movement of the display panel 10 after receiving a feedback control signal. As shown in FIG. 2, in the second state, the first unit 51 and the second unit 52 do not overlap in the first direction Z, and at this time, the display panel 10 is in a winded-up state or a stretched state.

In an embodiment, the motor-driven module may be a module that drives the display panel to stretch. Specifically, for example, the motor-driven module is a module that cooperates to shrink or release the display panel in a case where the display device changes between the first state and the second state, or for example, the motor-driven module is a module that drives the display device to vary between the first state and the second state.

Through configuring a position of the first unit 51 on the first module 41, a position of the second unit 52 on the second module 42 and the relative position of the first unit 51 and the second unit 52 in this embodiment, whether the first module 41 and the second module 42 are in a specific position relationship can be monitored, so that the stretching or shrinking movement of the display panel 10 can be controlled accurately in real time, avoiding damage to the corresponding structure due to the excessive movement of the display panel.

It should be noted that, based on different response principles, the first unit and the second unit may be configured to be in contact with or even pressed against each other in the first direction, or may be configured to have a certain interval distance in the first direction, or may be configured to have a certain interval distance in the second direction as long as the position relationship between the first unit and the second unit can be identified and responded by the control module, which is not limited herein.

In addition, in this embodiment, the control module 30 may employ a microprocessor, a control chip or the like. Using a flexible organic light-emitting display panel as an example, the display device may be applied to a slide-roll display device, the flexible organic light-emitting display panel may be winded-up or stretched under the driving of the motor-driven module 20, thus the display panel displays with different display areas in a display state. In addition, it should be noted that the relative position and size scale of various structures in the display device shown in FIGS. 1 and 2 are an example of the present disclosure, which is not limited thereto. It is to be understood that the relative position and related functions of related modules can be adjusted appropriately in the actual structure and function design.

In the embodiment of the present disclosure, the display device includes the display panel, the motor-driven module, the control module and the first module and the second module which are disposed opposite to each other in the first direction. The first module and the second module are able to move relatively in the second direction. In addition, the first unit is disposed on the side of the first module facing the second module. In response to the position relationship between the first unit and the second unit, the control module provides the first control signal for the motor-driven module to control the movement of the display panel, so that the real-time monitoring of the movement state of the display panel can be implemented by using the first unit and the second unit, thereby feedbacking and controlling the movement situation of the display panel, making the movement control of the display panel more accurate, and avoiding the damage to the screen or the driving mechanism caused by the excessive movement.

Figure 6:
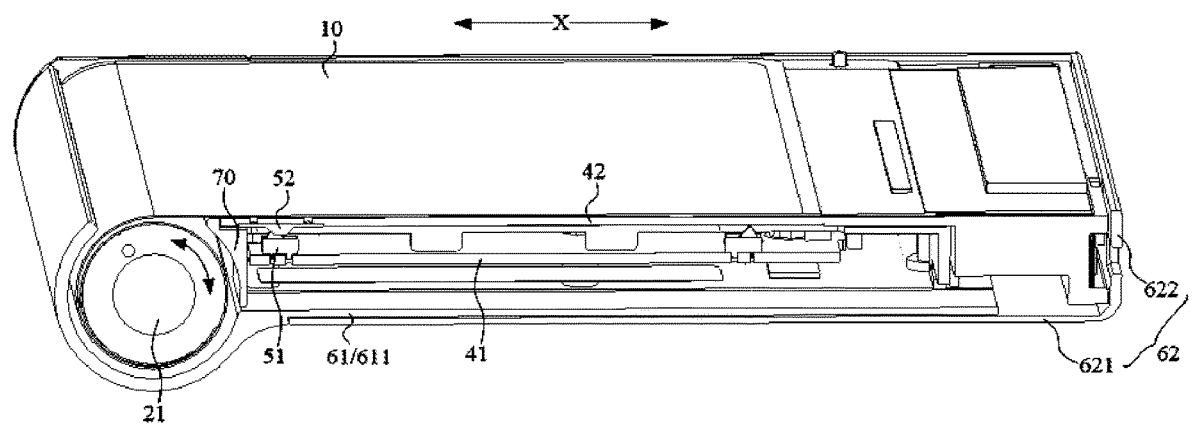
FIG. 6 is a structure diagram of another display device according to an embodiment of the present disclosure.

In an embodiment, the embodiment of the present disclosure also provides a specific embodiment of the motor-driven module. FIG. 6 is a structure diagram of another display device according to an embodiment of the present disclosure. Referring to FIG. 6, in the display device, the motor-driven module includes a reel 21 and a motor (not shown), an axis of the reel 21 is perpendicular to the first direction Z and the second direction X, and at least part of the display panel 10 may be winded on the reel 21. The motor may control the rotation of the reel, so that part of the display panel may be winded on the reel around the axis of the reel or be stretched from the reel under the driving of an external force, thereby implementing the change of the display size of the display panel.

Figure 3:
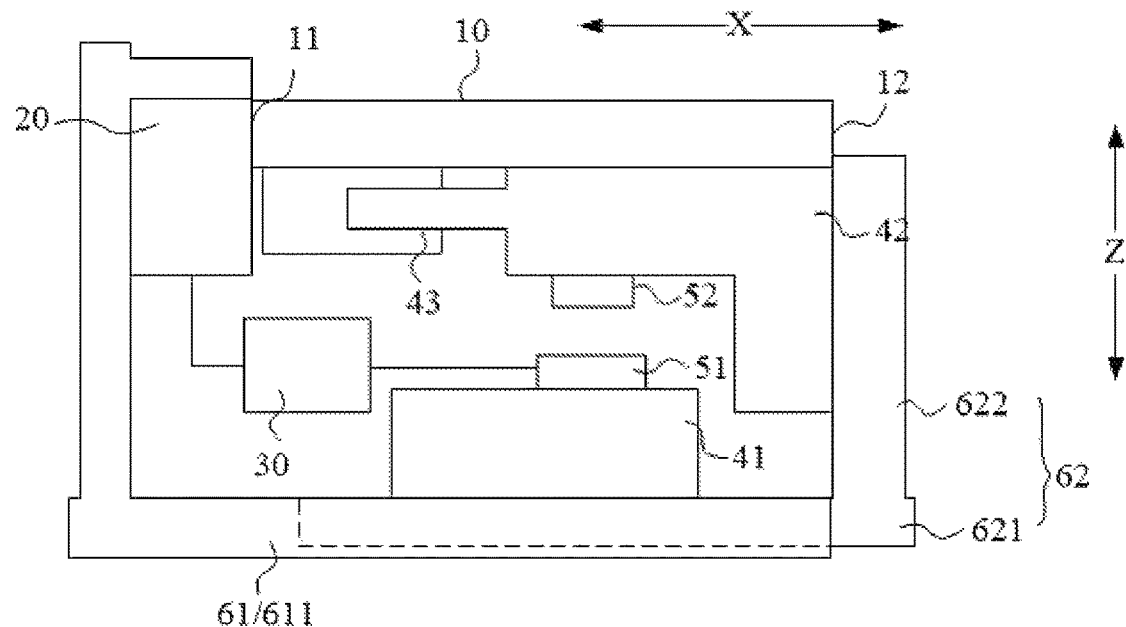
FIG. 3 is a structure diagram of another display device according to an embodiment of the present disclosure.
Figure 4:
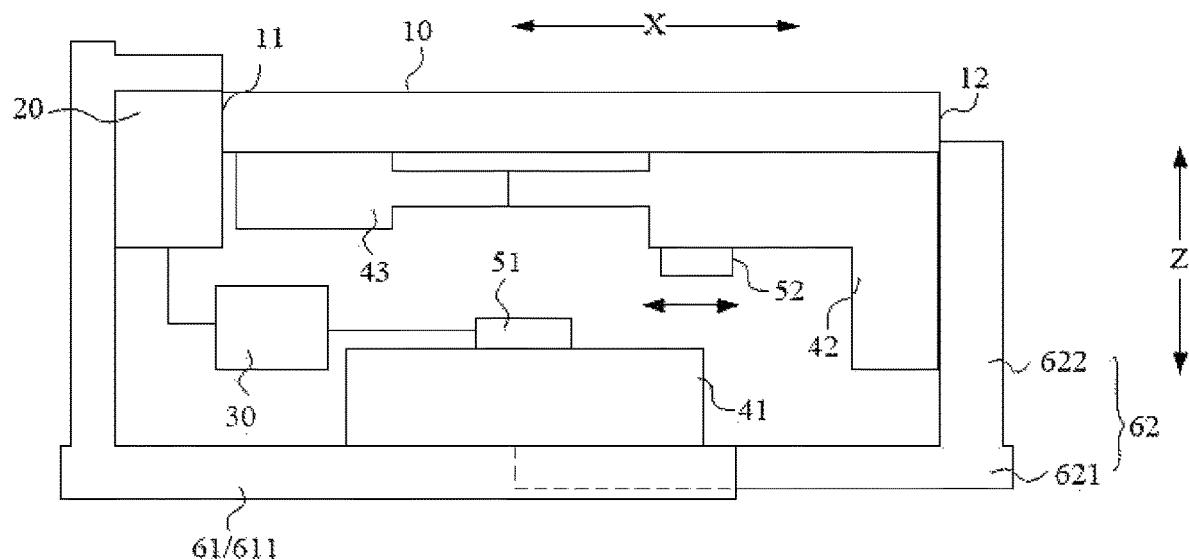
FIG. 4 is a structure diagram of another state of the display device shown in FIG. 3.

Referring to FIGS. 3, 4 and 6, FIG. 3 is a structure diagram of another display device according to an embodiment of the present disclosure. FIG. 4 is a structure diagram of another state of the display device shown in FIG. 3. It is to be understood by those skilled in the art, as described above, a first terminal 11 of a display panel 10 is fixed to a motor-driven module 20, actually in this embodiment, it is a first terminal 11 of a flexible display panel 10 that is fixed to a reel 21, the flexible display panel 10 is curled and winded on the reel 21, and a second terminal 12 is stretched as a free terminal and moves synchronously with a second housing 62 or a second module 42. Here, the motor may be responsible for driving the reel 21 to rotate in two opposite directions separately, so that the display panel 10 winded up on the reel 21 is stretched or shrunk automatically. Apparently, since the first unit 51 and the second unit 52 are provided, when the motor controls the display panel 10 to stretch and shrink, a position change between the first unit 51 and the second unit 52 may be equivalent to the stretching and shrinking distance of the display panel 10, thereby feedbacking and controlling the movement distance of the display panel 10, and accurately controlling the movement position of the display panel 10. It is to be noted that a first support plate 43 described in the above embodiment may be disposed between the reel 21 and the second module 42, and the first support plate 43 may be configured to be fixed with respect to a first housing 61. Specifically, a support connection structure 70 is disposed between the first housing 61 and the first support plate 43. The support connection structure 70 is fixed to the first housing 61, while the first support plate 43 is fixed to the support connection structure 70.

In the embodiment of the present disclosure, when a position relationship between the first unit and the second unit is sensed by a control module, the control module outputs a feedback signal to the motor-driven module, in this case, the reel in the motor module stops rotating, so that the display panel stops winding up and cannot be damaged due to the further over-stretching. In the present application, the flexible screen can implement functions of curling and shrinking by using the motor movement mechanism. Meanwhile, the problem of heating or damaging due to the motor failing to stop in time when the mechanism moves to the limit position can be avoided. This design is applied to the limit control of curling, stretching and shrinking to implement timely starting and stopping of the motor. In addition, the present application also has ideal accuracy; long service lifetime, high stability and simple circuit device, which is favorable to implement the miniaturization of the device.

The embodiment of the present disclosure provides a corresponding embodiment for how does the relative movement between the two modules cooperate to implement the movement of the display panel. Referring to FIGS. 1 and 2, specifically, the display panel 10 may include a first terminal 11 and a second terminal 12 opposite to each other, the first terminal 11 is fixed to the motor-driven module 20, and a relative position of the second terminal 12 and the second module 42 is fixed; and a relative position of the first module 41 and the motor-driven module 20 is fixed.

As shown in FIG. 1, the first terminal 11 is fixed to the motor-driven module 20, and the relative position of the motor-driven module 20 and the first module 41 is fixed, which means that the relative position of the motor-driven module 20, the first module 41 and the first terminal 11 does not change. The relative position of the second terminal 12 and the second module 42 is fixed, indicating that the relative position of the second module 42 and the second terminal 12 does not change. In other words, in a case where the second module 42 moves with respect to the first module 41 in a second direction X, the second terminal 12 also moves synchronously. It can be known that the first terminal 11 of the display panel 10 is fixed under the driving of the motor module 20, and the second terminal 12 moves with the second module 42 with respect to the first module 41, so that the display panel 10 can implement the stretching or shrinking movement.

It is to be noted that the relative position of two components being fixed in this embodiment includes but is not limited to that the two components are fixedly connected directly or indirectly through other components, as long as the position relationship between the two components does not shift in the second direction when the display device transits between the first state and the second state.

It can be seen that in the display device of the above embodiment, the second module 42 may move with respect to the first module 41 in the second direction X and one terminal of the display panel 10 is fixed to the second module 42, the display panel 10 moves with the movement of the second module 42, that is, the display panel 10 is substantially stretched or winded up in the second direction X, that is, a size of the display panel 10 can be changed in the second direction X, thereby achieving the effect of changing the display area.

Furthermore, referring to FIGS. 3 and 4, in a specific embodiment, the display device may also include the first housing 61 and the second housing 62. The first housing 61 and the second housing 62 are slidably connected to each other and slide relatively in the second direction. The first housing 61 accommodates the motor-driven module 20 and the first module 41, and the second housing 62 accommodates the second module 42.

The positions of the first housing 61 and the second housing 62 are not fixed and the first housing 61 and the second housing 62 can move relatively in the second direction X. The first housing 61 and the second housing 62 may form an accommodating cavity for accommodating and protecting the motor-driven module 20, the first module 41 and the second module 42. Exemplarily, the first housing 61 includes a first backplate 611 perpendicular to a first direction Z, and the second housing 62 includes a second backplate 621 perpendicular to the first direction Z. The first housing 61 and the second housing 62 are slidably connected to each other and slide relatively in the second direction X, which can be implemented through the first backplate 611 and the second backplate being slidably connected to each other and sliding relatively in the second direction X; or which may also be implemented through providing side plates on opposite sides of the first backplate and the second backplate in a direction perpendicular to the first direction and the second direction and providing slide rails matched with each other on the side plates, which is not excessively limited here.

In addition, the first housing 61 and the second housing 62 not only are used for forming an accommodation space, but also have a fixed connection relationship with accommodated structures. Specifically, the first module 41 is fixed to the first housing 61. The second module 42 is fixed to the second housing 62. In a case where the first housing 61 and the second housing 62 move relatively in the second direction X, the first module 41 and the second module 42 are driven to move relatively. Meanwhile, since the free terminal of the display panel 10 is fixed to the second module 42, the relative movement of the first housing 61 and the second housing 62 also drives the display panel 10 to stretch or shrink. It is to be understood that the first housing 61 and the second housing 62 also play the function of carrying the display panel 10 to a certain extent during the stretching process.

Furthermore, a second housing 62 may be configured to include a second backplate 621 and a side wall 622 away from a side of the first housing 61, where the second module 42 is parallel to the second backplate 521 and is connected to the second backplate 622 through the side wall, the second module 42 is configured to support the display panel 10; and the first module 41 is located between the second module 42 and the second backplate 621 and is fixedly connected to the first housing 61.

It is to be understood that dotted lines in FIGS. 3 and 4 represent parts nested by the second backplates 621 for ease of understanding.

It is to be understood that since the second module 42 is connected to the side wall 622 of the second housing 62, thus the second module 42 is synchronously driven to move in a case where the second housing 62 moves in the second direction X with respect to the first housing 61. In other words, the movement of the second module 42 is synchronized with the second housing 62, and the display panel 10 is also moved with the movement of the second housing 62 since the relative position of the second terminal 12 of the display panel 10 and the second module 42 is fixed. In this case, the second module 42, the second unit 52, the second housing 62 and the second terminal 12 of the display panel 10 in the entire display device move synchronously in the second direction X with respect to the first module 41. The second housing 62 may be used as a protection structure for protecting a structure in an accommodation space inside the housing, such as the first module 41. There is a position change between the second unit 52 and the first unit 51, during which the control module 30 generates a first control signal in response to the position change.

Figure 5:
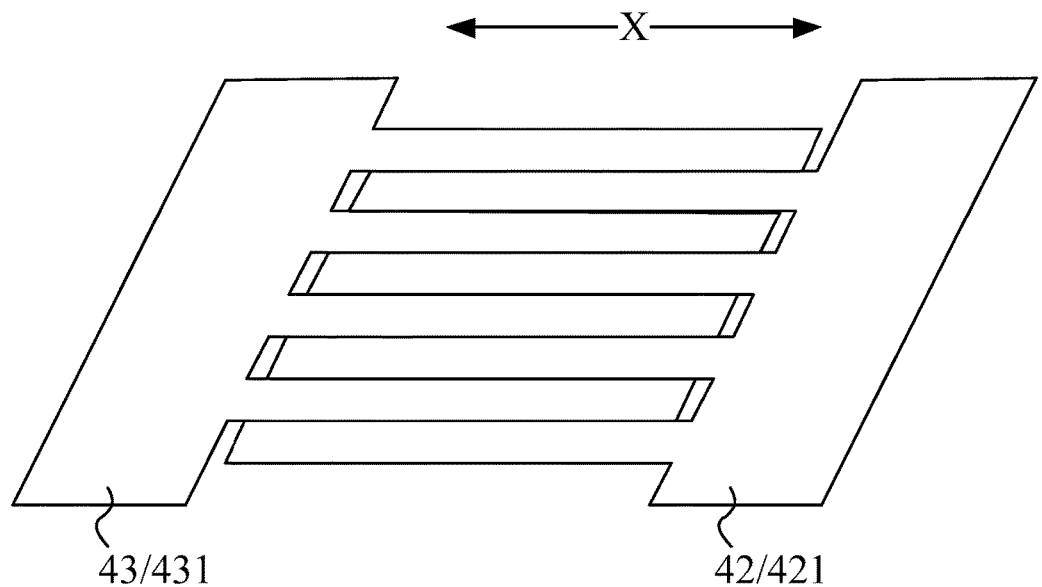
FIG. 5 is a partial structure diagram of a display module shown in FIG. 3.

FIG. 5 is a partial structure diagram of a display module shown in FIG. 3. Referring to FIGS. 3 to 5, to cooperate with the movement of the second module 42 in the second direction X, in an embodiment, the display device is further provided with a first support plate 43 fixed to the first housing 61. In a direction of thickness of the display device, the first support plate 43 is a first comb structure 431, the second module 42 is a second comb structure 421, the first comb structure 431 meshes with the second comb structure 421, and the second module 42 and the first support plate 43 are able to support the display panel 10 jointly. The thickness direction of the display device is essentially a stacking direction among the display panel, the first module and the second module, that is, a longitudinal direction as shown in FIGS. 3 and 4.

It is to be understood that the first support plate 43 is essentially a fixed structure in the display device. The fixed structure is fixedly connected to the first housing 61. That the first support plate 43 and the second module 42 are comb structures means that orthographic projections of the second module 42 and the first support plate 43 in the thickness direction of the display device (i.e., in the longitudinal direction in the figure) are comb structures for limiting the second module 42 in a direction in which comb teeth are arranged, that is, in a direction perpendicular to the second direction X in a horizontal plane by the comb teeth on the first support plate 43, so as to ensure that the second module 42 moves in an extension direction of the comb teeth, that is, in the second direction X. In addition, it is to be noted that a specific position of the second unit 52 in the second module 42 is not limited here as long as requirements of the relative position relationship between the second unit 52 and the first unit 51 are met during the movement process. The second unit 52 may be designed on the teeth of the second comb structure 421, and may also be designed on a main structure of the second comb structure 421.

In embodiments of the present disclosure, the comb structure may be used as a supporting substrate of the display panel, and may also implement meshing in one direction to change the size in the direction. In a case where the two comb structures are separated, a larger bearing space is provided for the display panel to increase the display size, and in a case where the comb structures are meshed, the bearing space of the display panel is reduced to reduce the display size.

In an embodiment, the first housing 61 and the second housing 62 are essentially a structure having openings opposite to each other and nested with each other. It is to be noted that the first comb structure, the first backplate and a side wall connecting the first comb structure and the first backplate form an accommodation space in a shape of a Chinese character "⊏". Similarly, the second comb structure, the second backplate and a side wall connecting the second comb structure and the second backplate form an accommodation space in a shape of a Chinese character "⊏". The two accommodation spaces in the shape of two Chinese characters "⊏" are used as openings opposite to each other and nested with each other to form the accommodation space.

In an embodiment of the present disclosure, the first module is a circuit board in order to save space. The circuit board is electrically connected to the display panel to drive the display panel to display. The circuit board is provided with a circuit structure for driving the display panel to display. In an embodiment, the circuit board is electrically connected to the control module and the first unit, and is used for converting the position relationship between the first unit and the second unit into an electrical signal, and outputting the electrical signal to the control module variably. It is to be understood that the first unit disposed on the first module needs to perform a signal transmission to the control module to feedback the position relationship between the first unit and the second unit. Therefore, the first unit is directly disposed on the circuit board, that is, the circuit board is directly used as the first module, and the wiring is disposed on the circuit board to be electrically connected to the control module, thereby avoiding increasing the space and structure inside the display device in a case where the first unit and the first module are additionally arranged. Of course, the present disclosure is not limited to this. In other embodiments, feedback and control may be performed on the motor module by reasonably configuring a circuit board with an appropriate size as the first module and connecting the control module through this circuit board.

Based on the above embodiment in which the motor-driven module drives the display panel to change the display area, the logic and principle of feedbacking and controlling the display panel by the first unit and the second unit will be introduced in detail below. Firstly, to avoid the excessive movement of the display panel driven by the motor module, as described in the above embodiment, the control module provides the first control signal for the motor-driven module in response to the position relationship between the first unit and the second unit. In one embodiment of the present disclosure, the first unit includes a switch structure, and the second unit controls an switch state of the first unit by changing the position relationship between the second unit and the first unit so as to control the control module to provide the first control signal for the motor-driven module.

Furthermore, the embodiments of the present disclosure provide a control circuit of the motor-driven module to implement the position change of the first unit and the second unit to change the switch state of the first unit. In a case where the first unit is in contact with the second unit, the switch structure is turned on, and a second control signal is transmitted to the control module through the switch structure, so that the control module generates the first control signal to the motor-driven module. Here, the first unit is in contact with the second unit, which means that the second unit is in contact with the first unit in the first direction Z, and in practice, it should be ensured that a pressing force is provided between the second unit and the first unit to ensure the contact effect, and that the first unit generates the second control signal to the control module in response to the position relationship between the first unit and the second unit.

The first control signal is a brake signal for braking the motor-driven module. It is to be noted that the brake signal refers to a brake signal for stopping the rotation of the reel or a brake signal for stopping the relative movement of the first housing and the second housing.

Figure 7:
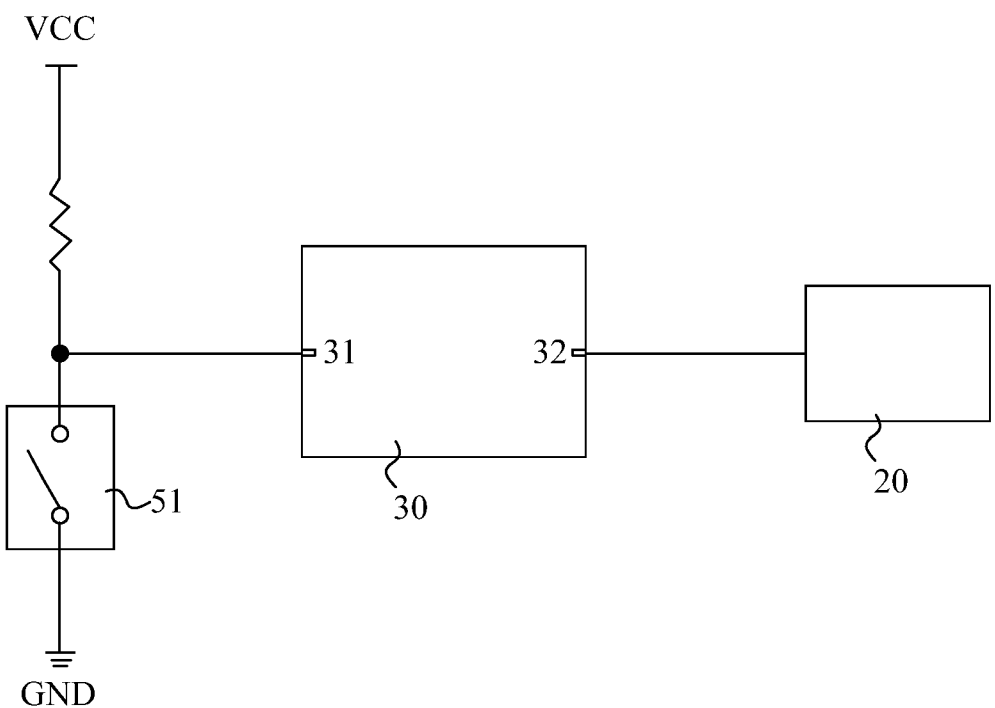
FIGS. 7 and 8 are schematic diagrams illustrating two types of connections between a first unit and a control module according to an embodiment of the present disclosure.
Figure 8:
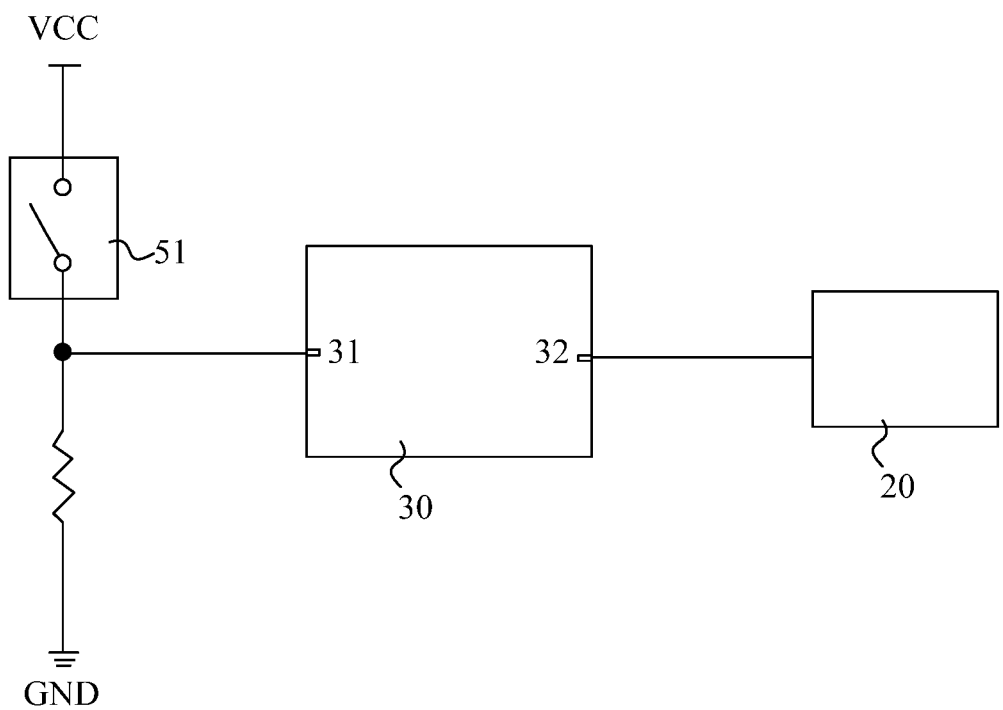

FIGS. 7 and 8 are schematic diagrams illustrating two types of connections between a first unit and a control module according to an embodiment of the present disclosure. Referring to FIGS. 7 and 8, the first module 41 is provided with a high-voltage power supply terminal VCC and a ground terminal GND. The first unit 51 is connected in series between the high-voltage power supply terminal VCC and the ground terminal GND. An input terminal 31 of the control module 30 is electrically connected between the high-voltage power supply terminal VCC and the first unit 51, and the second control signal is a high voltage. The input terminal 31 of the control module 30 is electrically connected between the ground terminal GND and the first unit 51, and the second control signal is a grounding voltage; and an output terminal 32 of the control module 30 is electrically connected to the motor-driven module 20. The first unit 51 switches the switch state in a case where the first unit 51 is in contact with the second unit 52.

Specifically, the control module 30 may change the first control signal from a high-level signal to a low-level signal or from a low-level signal to a high-level signal in the case where the first unit 51 is in contact with the second unit 52.

The feedback and control principle of the first unit and the second unit described above will be described below by using an example in which the switch structure of the first unit 51 is turned off in a normal state. First, referring to FIGS. 6 and 7, the switch structure of the first unit 51 is turned off in the normal state, that is, in a case where the first unit 51 and the second unit 52 move relatively but are not in contact with each other, it is to be understood that since the input terminal 31 of the control module 30 is electrically connected between the high-voltage power supply terminal VCC and the first unit 51, the input terminal 31 receives a high voltage signal provided by the high-voltage power supply terminal VCC, and the control module 30 receives the high-level signal in the normal state. In a case where the first unit 51 and the second unit 52 are in contact with each other due to the relative movement to switch the switch state, the switch structure is switched to a turn-on state. In this case, the input terminal 31 of the control module 30 is directly grounded through the first unit 51, that is, the control module 30 becomes receiving the low-level signal. Referring to FIGS. 6 and 8, similarly, the switch structure of the first unit 51 is turned off in the normal state, and since the input terminal 31 of the control module 30 is electrically connected between the ground terminal GND and the first unit 51, the input terminal 31 receives a ground signal from the ground terminal GND, and the control module 30 receives the low-level signal in the normal state. In the case where the first unit 51 and the second unit 52 are in contact with each other due to the relative movement and switch the switch state, the switch structure is switched to a turned-on state. In this case, a voltage of the input terminal 31 of the control module 30 is raised by the high-voltage power supply terminal VCC, and the voltage received by the input terminal 31 is changed from the low-level signal to the high-level signal. In the above two cases, according to the hopping of the level signal received by the input terminal 31, the control module may determine and learn that the first unit 51 and the second unit 52 are in contact with each other. After a reasonable position design, that the first unit 51 and the second unit 52 are in contact with each other represents a specific stretching and shrinking state of the display panel, such as stretching in place or shrinking in place. It is to be noted that stretching in place and shrinking in place means that the display panel is stretched to a limit position or the display panel is shrunk to a limit position. The limit position here means that a position where the display panel is shrunk to a minimum display size or stretched to a maximum display size and the display panel cannot be damaged. In this case, the control module 30 can accurately control the display panel to stop the movement by using hopping information of the level signal, thereby accurately controlling the movement of the display panel.

It is to be noted that in the circuit structure shown in FIGS. 7 and 8, electronic devices such as a resistance can be disposed on a line from the high-voltage power supply terminal VCC where the first unit 51 is located to the ground terminal GND to adjust a voltage of a connection node connected to the input terminal 31, thereby meeting input requirements of the control module 30. In addition, the above circuit structure is merely one implementable mode of the present disclosure, and other implementation modes can also be designed by those skilled in the art, which is not limited here.

In the embodiments of the present disclosure, the response mode of the control module to the first unit and the second unit can be implemented by a mechanical key switch, or by an electromagnetic component, a photoelectric component, a capacitive component and the like. The mechanical key switch is described below firstly.

Figure 9:
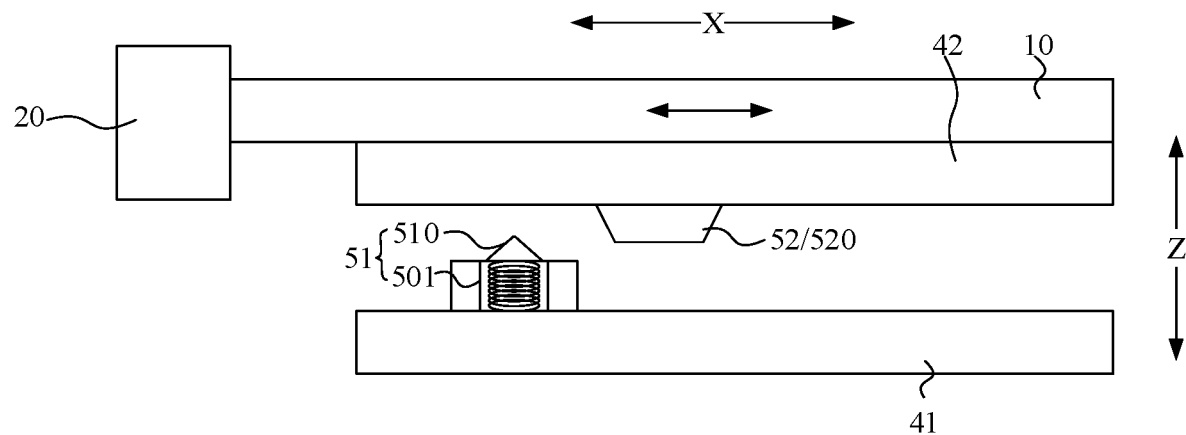
FIG. 9 is a partial structure diagram of another display device provided by the present disclosure.

FIG. 9 is a partial structure diagram of another display device provided by the present disclosure. Referring to FIG. 9, in the display device, a first unit 51 is a key switch, a side of the first unit 51 facing the second unit 52 is provided with a first protrusion structure 510, a side of the second unit 52 facing the first unit 51 is provided with a second protrusion structure 520, and in a case where the second unit 52 moves to be in contact with the first unit 51, the first protrusion structure 510 and the second protrusion structure 520 are pressed against each other to cause the key switch to be turned on or turned off.

Furthermore, the first unit 51 further includes an elastic member 501 located on a side of the first protrusion structure 510 facing away from the second protrusion structure 520. The elastic member 501 is in contact with the first protrusion structure 510 and has elasticity in the first direction Z.

The first unit 51 and the second unit 52 may move relatively in a second direction X by disposing the first protrusion structure 510 and the second protrusion structure 520 opposite to each other, changing from moving depart from each other in the second direction X to being aligned in the second direction X and being contacted with or even pressed against each other in the first direction Z, so that the key switch is switched from a second state to a first state. Since the first unit 51 is a key switch structure, the elastic member 501 in the first unit 51 may generate a certain amount of contraction so that the key switch implements the switching of a switch state. In an embodiment, the elastic member 501 may be a spring, and may be a material having elasticity such as rubber.

It is to be understood that the first unit and the second unit are configured to be a mechanical structure in which the first unit and the second unit are in contact with each other, and the first unit is specifically configured as a key switch, which can implement feedbacking and controlling of a motor-driven module in a case where the key switch is switched from the second state to the first state. In other words, the first unit and the second unit using the simple mechanical structure are more sensitive and accurate in response to the positions, and can more accurately feedback and control the position of the display panel. Moreover, in the case where the first unit and the second unit are in contact with each other, a certain force of friction is generated, which has a certain effect on reducing the movement speed of the display panel and ensuring the display panel to brake at a specific position. Based on this, in the embodiments of the present disclosure, the protrusion structures on the first unit and the second unit can also be designed in detail. For example, a groove or a protrusion structure may be provided on a top surface where the first protrusion structure 510 and the second protrusion structure 520 contact, thereby increasing the roughness of the top surface and playing a role in increasing the force of friction. In addition, the mechanical first protrusion structure 510 and second protrusion structure 520 do not cause electromagnetic interference to the circuits and components inside the display device and do not affect the normal operation of the internal circuits.

In this embodiment, the first unit 51 and the second unit 52 are a combination structure in which the first unit 51 and the second unit 52 are in pair, that is, the number of the first units 51 is equal to the number of the second units 52, and the first units 51 are in one-to-one correspondence with the second units 52. Using a pair of the first unit and the second unit for detecting whether the display panel is stretched in place as an example, the first unit and the second unit synchronously move relatively in the second direction X during the stretching process of the display panel, and in a case where the display panel is stretched in place, the first unit and the second unit are just moved to a state of being in contact with and pressed with each other in the first direction Z. In this case, the elastic member 501 is in a state of compression, that is, the key switch is switched to the first state, thereby providing the feedback for the control module through the key switch structure of the first unit switching the switch state, thus further controlling the motor-driven module to control the display panel to stop stretching. Similarly, for detecting, feedbacking and controlling whether the display panel is shrunk in place, another pair of the first unit and the second unit may be provided. In a case where the display panel is shrunk in place, the first unit and the second unit just move to the state of being in contact with and pressed with each other in the first direction Z, the elastic member 501 is in the state of compression, the key switch is switched to the first state, so that the feedback and control of the motor-driven module is implemented through the key switch structure of the first unit.

In addition, it is to be noted that the first unit also needs to design with a circuit structure corresponding to the key switch in addition to be provided with the mechanical structure, for example, the first unit includes two electrodes for connecting a high-voltage power supply terminal VCC and a ground terminal GND disposed in the first module respectively. In addition, to facilitate installing the first unit on the first module and installing second unit on the second module, corresponding engaging structures may be disposed on the first unit and the second unit, and corresponding engaging grooves may be disposed on the first module and the second module, so that the first unit and the second unit are engaged and fixed on the first module and the second module respectively, and specific examples will not be given here.

Figure 10:
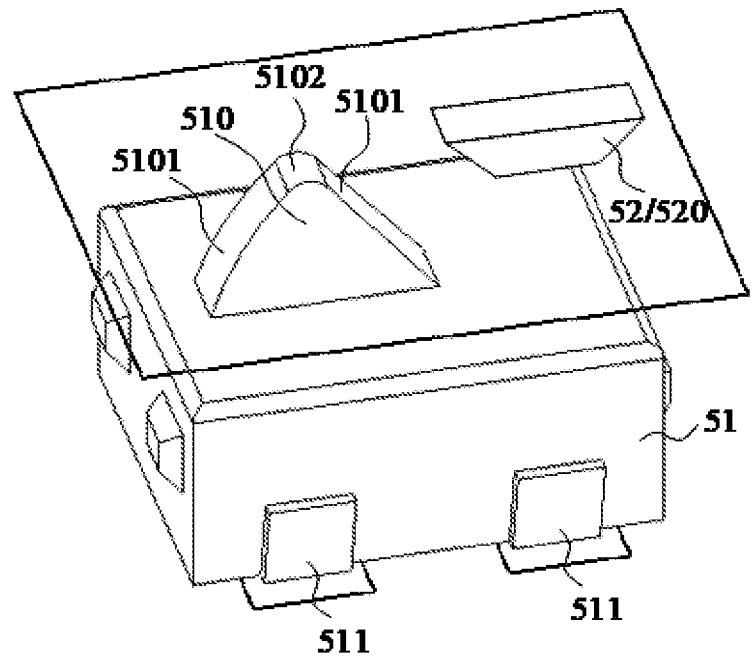
FIG. 10 is a structure diagram of a first unit according to an embodiment of the present disclosure.

The present disclosure also provides various embodiments based on different considerations for the specific design of shapes of the protrusion structures on the first unit and the second unit. FIG. 10 is a perspective diagram of the first unit and the second unit according to an embodiment of the present disclosure. Referring to FIGS. 9 and 10, in an embodiment, a side of the first protrusion structure 510 facing the second protrusion structure 520 is an inclined surface (a first inclined surface 5101 facing the second protrusion structure 520 as shown in FIG. 10). In a direction from the first module 41 to the second module 42, the inclined surface is inclined along a side facing away from the second protrusion structure 520.

Since the first protrusion structure 510 moves facing the second protrusion structure 520 until to a state of pressing against the second protrusion structure 520 in the first direction Z, configuring a side of the first protrusion structure 510 facing the second protrusion structure 520 may ensure that the first protrusion structure 510 and the second protrusion structure 520 slide relatively on this inclined surface until to the state of pressing against each other in the first direction Z. It is to be understood that orthographic projections of the first protrusion structure 510 and the second protrusion structure 520 in the second direction X overlap, and in a case where sides opposite to each other in the second direction X of the first protrusion structure 510 and the second protrusion structure 520 are both perpendicular to the second direction X, during the first protrusion structure 510 moving close to the second protrusion structure 520 in the second direction X, a part of the first protrusion structure 510 conflicts with a part of the second protrusion structure 520, that is, the first protrusion structure 510 and the second protrusion structure 520 are detented. Apparently, the sides opposite to each other of the first protrusion structure 510 and the second protrusion structure 520 are configured to be inclined surfaces, so that the first protrusion structure 510 and the second protrusion structure 520 can be prevented from being detented in the second direction X and mechanical damages also can be prevented even if the orthographic projections of the first protrusion structure 510 and the second protrusion structure 520 in the second direction X overlap. In addition, the inclined surfaces of the two protrusion structures slide each other until the first protrusion structure 510 and the second protrusion structure 520 are aligned with each other in the first direction Z, which can ensure that the first protrusion structure 510 and the second protrusion structure 520 are pressed against each other, and the key switch is effectively pressed for the structure using the key switch.

It is to be understood that as shown in FIG. 10, the first unit is a specific designed example, two sides which are facing away from each other of the first protrusion structure 510 in the second direction X are provided with first inclined surfaces 5101 which are symmetrical to each other; an intersection point of extension lines of the first inclined surfaces 5101 is located on the side of the first unit 51 facing the second unit 52; and the two inclined surfaces 5102 are connected through a cambered surface 5102 which protrudes facing the second unit 52. In the case where the first unit and the second unit move relatively in the second direction until to be aligned with each other in the first direction Z, the design of the cambered surface can not only ensure the first unit to slide relatively on the second unit, reducing a force of friction between the first unit and the second unit, but also avoid the damage to the second unit in a case where the first unit is configured to be a sharp protrusion structure.

It is to be noted that, as shown in FIG. 10, the second protrusion structure 520 merely shows a plane where the second protrusion structure 520 is located, and as shown in FIG. 9, the second protrusion structure 520 actually should be disposed on a surface of the second module 42 facing the first module 41. In addition, FIG. 10 also shows a circuit structure in the key switch. The circuit structure includes two electrodes 511. FIG. 10 also shows a pad structure connected to the electrodes 511.

Figure 11:
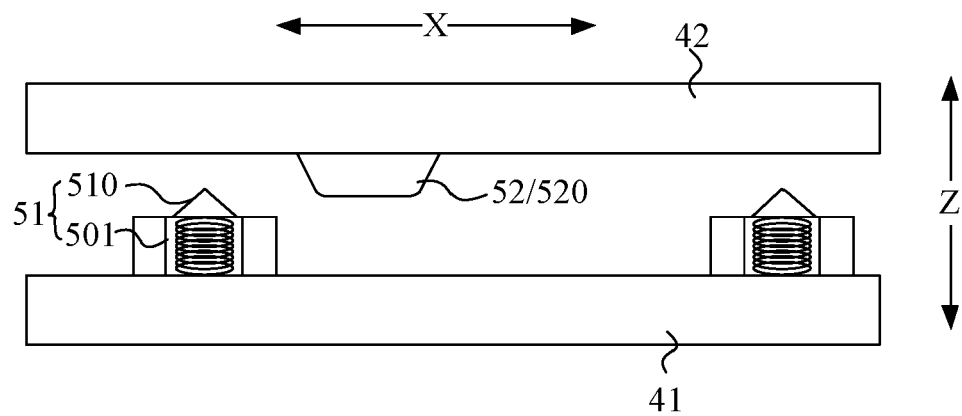
FIG. 11 is a partial structure diagram of another display device according to an embodiment of the present disclosure.
Figure 12:
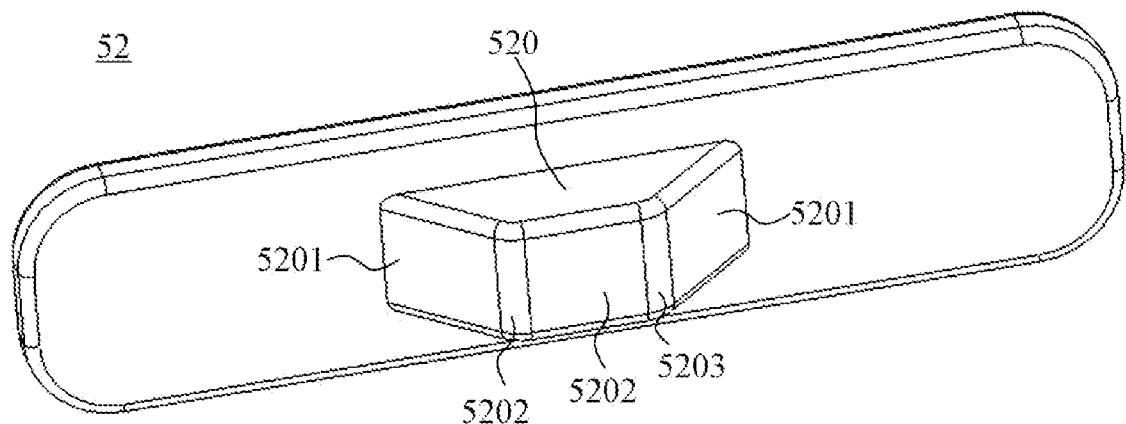
FIG. 12 is a structure diagram of a second unit according to an embodiment of the present disclosure.

In another embodiment of the present disclosure, optionally, a side of a second protrusion structure 520 facing a first protrusion structure 510 is an inclined surface. In a direction from a second module 42 to a first module 41, the inclined surface is inclined along a side facing away from the first protrusion structure 510. Based on this, the embodiments of the present disclosure further provide a display device. FIG. 11 is a partial structure diagram of another display device according to an embodiment of the present disclosure. FIG. 12 is a structure diagram of a second unit according to an embodiment of the present disclosure. Referring to FIGS. 11 and 12 (also referring to FIGS. 14 and 15 herein), the display device may be configured to include at least two first units 51. A second unit 52 is located between at least two first units 51. Two sides which are facing away from each other of the second protrusion structure 520 in the second direction X are provided with second inclined surfaces 5201 which are symmetrical to each other. An intersection point of extension lines of the second inclined surfaces 5201 is located on the side of the second unit 52 facing the first unit 51; and the second protrusion structure 520 further includes a top surface 5202 closing to a side of the first protrusion structure 510, where the top surface 5202 is parallel to the second direction X, the two second inclined surfaces 5201 is connected through the cambered surface 5203, the top surface 5202 and the cambered surface 5203 sequentially.

Referring to FIGS. 10 and 11, the first inclined surface 5101 on the first unit 51 and the second inclined surface 5201 on the second unit 52 are opposite to each other. To ensure the first inclined surface 5101 to be matched with the second inclined surface 5201, in an embodiment, the first inclined surface 5101 and the second inclined surface 5201 which are opposite to each other in the second direction X may be configured to be in parallel with each other.

In this embodiment, the at least two first units 51 and one second unit 52 are provided, and the second unit 52 actually moves primarily between the two first units 51 in the second direction X. Referring to FIG. 9, it is to be understood that in a case where the second unit 52 moves along with the second module or the display panel in the second direction X, and the second unit 52 is in contact with and pressed against the first unit 51 on a first side in the first direction Z, the first unit 51 feeds back a current movement position of the display panel, and the control module responds, feeds back and controls a motor-driven module. In a case where the second unit 52 is in contact with and pressed against the first unit 51 on a second side in the first direction Z, the first unit 51 feeds back another position state of the display panel, and the control module responds, feeds back and controls the motor-driven module.

Specifically, as shown in FIG. 11, during the process of the display panel 10 moving back and forth in the second direction X (i.e., during the switching between the first state and the second state), the second module 42 moves in the second direction X synchronously with respect to the first module 41, in the case where the second unit 52 moves to be aligned with and pressed against the first unit 51 on a left side in the first direction Z, indicating that the display panel 10 reaches a shrinking-in-place state under the control of the motor-driven module 20, in this case, the control module (not shown in the figure) controls the motor-driven module 20 in response to a position relationship between the second unit 52 and the first unit 51 on the left side being aligned with each other in the first direction Z, so that the display panel stops shrinking. Similarly, for the first unit in a right side, in a case where the second unit 52 moves over the first unit 51 on the right side in the second direction X along with the second module 42, and the second unit 52 is aligned with and pressed against the first unit 51 in the first direction Z, it is indicated that the display panel 10 reaches a stretching-in-place state under the control of the motor-driven module 20. In this case, the control mode (not shown in the figure) controls the motor-driven module 20 in response to the position relationship between the second unit 52 being aligned with the first unit 51 on the right side in the first direction Z, so that the display panel 10 stops stretching.

Figure 13:
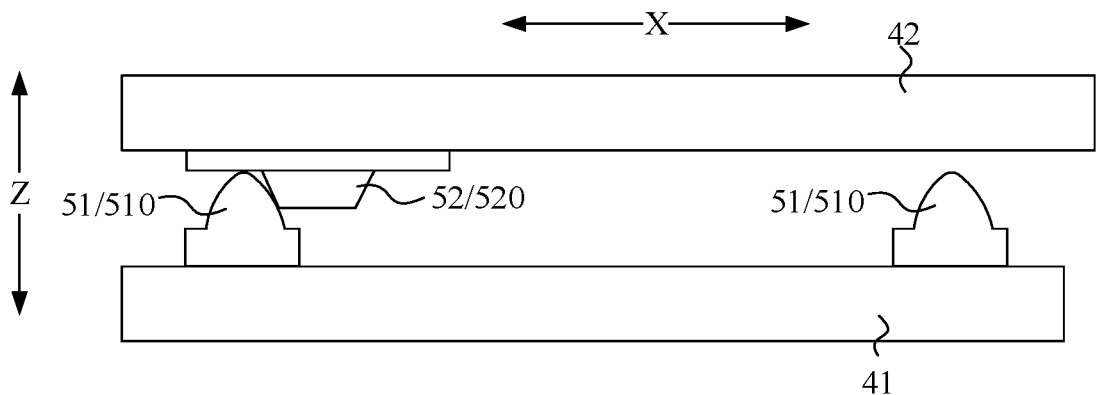
FIG. 13 is a partial structure diagram of another display device according to an embodiment of the present disclosure.

FIG. 13 is a partial structure diagram of another display device according to an embodiment of the present disclosure. Referring to FIG. 13, in an embodiment, the display device includes at least two unit groups, where one unit group of the at least two unit groups includes at least one second unit 52 and at least two first units 51; and in a same unit group, the first units 51 and the second unit 52 are alternately arranged in the second direction X.

In this embodiment, at least two unit groups are actually arranged in a third direction Y which is perpendicular to a first direction Z and a second direction X separately. It is to be understood that in a case where a display panel 10 moves in the second direction X, due to a workpiece assembly error or the like, the movement amount of the display panel 10 at different positions in the third direction Y may be deviated, for example, the movement amount on a first side of the third direction Y is small and the movement amount on a second side is large. Therefore, to more accurately control the movement of the display panel 10, multiple unit groups are provided in the third direction Y in this embodiment, and the movement of the display panel 10 at different positions may be monitored and fed back by using the unit groups at different positions. In a case where each unit group includes at least one second unit 52 and at least two first units 51, similarly, the second unit 52 may move synchronously with the display panel 10 and should be move between the two first units 51.

Furthermore, in an embodiment, the first units 51 in different unit groups may be arranged to be aligned in the third direction Y, or distances between the two first units 51 in the different unit groups may be arranged to be equal. In this case, a position relationship between the first units and the second unit in the different unit groups is consistent, the position change of the first units and the second unit in the different unit groups is synchronized in a case where the first units and the second unit move in the second direction X, and the different unit groups may respond consistent control signals to the control module.

It is to be noted that considering the existence of workpiece error and assembly error, the movement amount of the display panel 10 at different positions in the third direction Y may be deviated, response times of different unit groups may be different. In a case where the control module feedbacks and controls a motor-driven module, it is necessary to specify a response sequence or a response logic of the control module to the position relationship between the first units and the second unit in each unit group. Thus, the embodiment of the present disclosure provides a specific implementation. In an embodiment, the first units in different unit groups may be connected in series or in parallel. The first units in the different unit groups are connected in series, so that a second control signal is output to the control module in a case where the first units in the different unit groups both in the third direction Y are both in contact with the second unit in the corresponding unit group, thus the control module outputs a first control signal to the motor-driven module, so that the motor-driven module does not drive the display panel to move continuously. Preferably, the first units in different unit groups are connected in parallel, so that the second control signal is output to the control module in a case where at least one of the first units in the different unit groups both in the third direction Y is in contact with the second unit in the corresponding unit group, thus the control module outputs the first control signal to the motor-driven module, so that the motor-driven module does not drive the display panel to move continuously. This ensures that, in a case where the assembly error of the display device exists, the movement amount of the display panel 10 at different positions in the third direction Y may be deviated, and the display panel 10 stops in a case where the display panel 10 reaches the limit as long as one of the first units is in contact with the second unit, so that the display panel cannot be damaged.

In the embodiment of the present disclosure, the response of the control module to the position relationship between the first units and the second unit depends on that all unit groups meet requirements of the position relationship, or in a case where any one of the unit groups meets the requirements of the position relationship, the control module can be fed back to control the motor-driven module.

Figure 14:
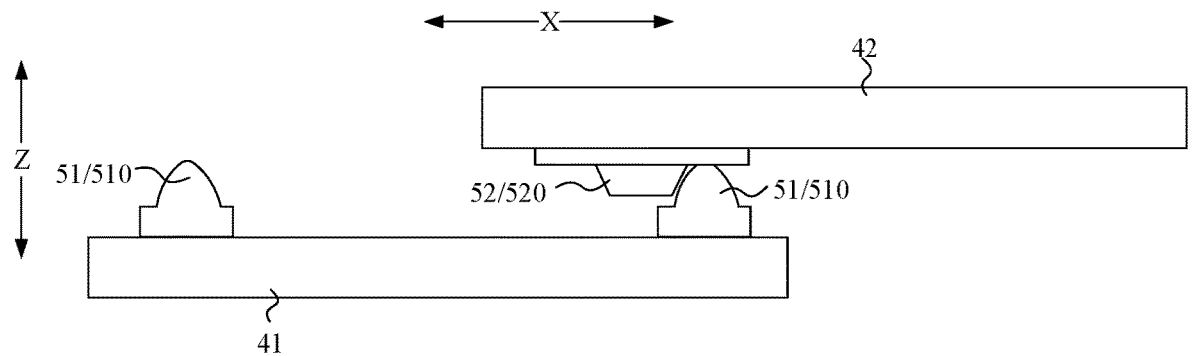
FIGS. 14 and 15 are schematic diagrams illustrating two states of another display device according to an embodiment of the present disclosure.
Figure 15:
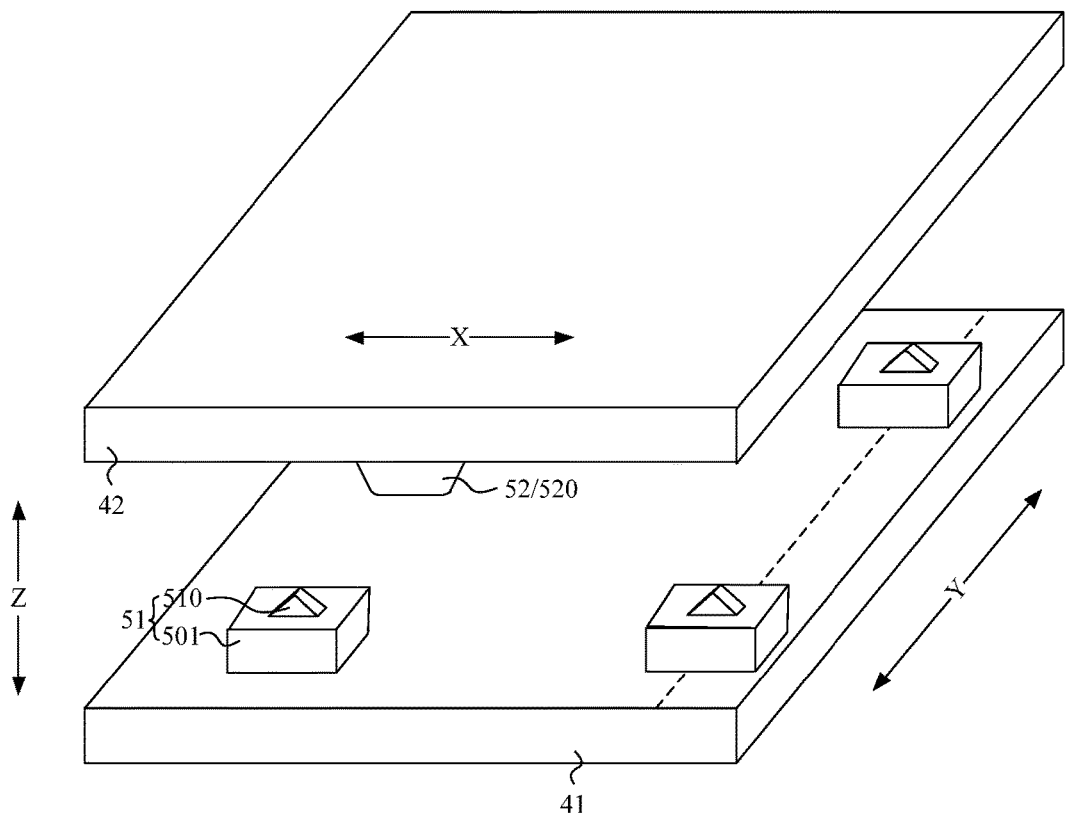

FIGS. 14 and 15 are schematic diagrams illustrating two states of another display device according to an embodiment of the present disclosure. Referring to FIGS. 14 and 15, similarly, in the display device of this embodiment, two first units 51 may be provided. The second unit 52 is located between the two first units 51, The first units 510 may be configured as a bullet protrusion structure and the second unit 52 may be configured as a platform-like protrusion structure.

Figure 16:
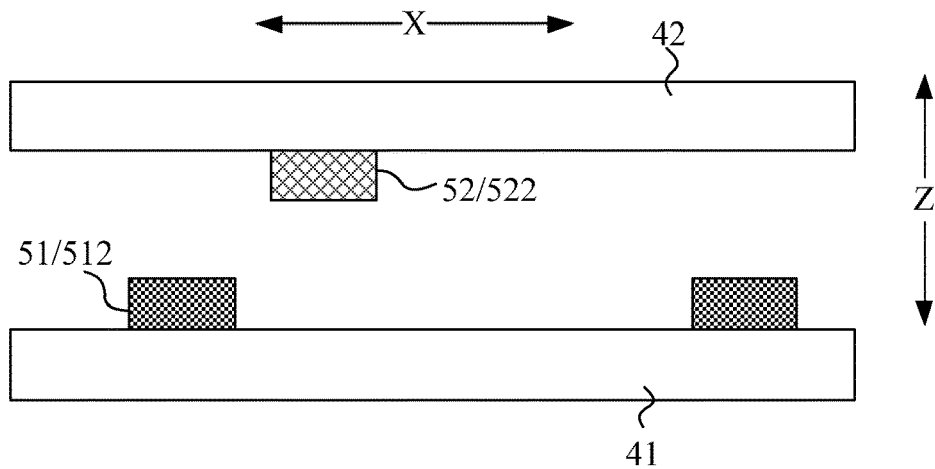
FIG. 16 is a structure diagram of another display device according to an embodiment of the present disclosure.

The embodiment of the present disclosure also provides an implementable mode for implementing the response of the control module to the first unit and the second unit by using an electromagnetic component. FIG. 16 is a structure diagram of another display device according to an embodiment of the present disclosure. Referring to FIG. 16, in this display device, the first unit 51 is a Hall element 512 and the second unit 52 is a magnetic block 522; and the Hall element 512 changes an output voltage in response to a position relationship between the Hall element 512 and the magnetic block 522; and the control module is configured to control a working state of a motor-driven module (not shown in the figure) according to the change of the output voltage.

First, the Hall element 512 works according to a Hall effect. Specifically, in a case a current is introduced into the Hall Element 512 and passes through the Hall element 512 perpendicular to an external magnetic field, carriers in the Hall element 512 deflect, thereby generating an additional electric field in a direction perpendicular to the current and the magnetic field. The Hall element 512 exhibits a potential difference at both terminals. The following is an example of a control circuit between the Hall element and the control module as well as the motor-driven module. In an embodiment, the Hall element includes a first terminal and a second terminal opposite to each other, and a third terminal and a fourth terminal opposite to each other. A connection line of the first terminal and the second terminal intersects with a connection line of the third terminal and the fourth terminal. The first terminal and the second terminal conduct the current, the third terminal and the fourth terminal are respectively connected to two input terminals of the control module, and an output terminal of the control module is electrically connected to the motor-driven module. In this case, in a case where a magnetic block approaches the Hall element, the magnetic field of the magnetic block itself causes the third terminal and the fourth terminal of the Hall element to generate an electromotive force (i.e., a voltage signal), and the two input terminals of the control module respond according to the voltage signal and provide a first control signal to the motor-driven module.

Based on this, in this embodiment, the Hall element 512 maintains an electrical connection relationship with the control module 30, and outputs a fixed electromotive force, i.e., the voltage signal, to the control module 30 in a normal state, that is, in a case where positions of the first unit and the second unit are relatively far away and the effective Hall effect cannot be generated. In a case where positions of the magnetic block 522 and the Hall element 512 are relatively close to a set distance range, between the Hall element 512 and the magnetic block 522, a strong Hall effect is responded, the Hall element 512 forms the electromotive force and changes the output voltage provided for the control module 30 as a feedback signal, and the control module 30 performs feedback and control on the motor-driven module based on the signal.

It is to be noted that as long as a certain distance between the Hall element 512 and the magnetic block 522 is met, the effective Hall effect may be generated. Therefore, at the time of configuring the positions of the Hall element 512 and the magnetic block 522, there is no need to ensure that the Hall element 512 is in contact with and pressed against the magnetic block 522. In addition, to accurately detect and control a stretching and shrinking position of the display panel, in this embodiment, the control module needs to sensitively detect the change of the output voltage generated by the Hall element 512 so as to identify the output voltage in a case where the magnetic block 522 and the Hall element 512 are totally aligned, thereby feedbacking and controlling the motor-driven module so as to stop the magnetic block 522 and the Hall element 512 in the case where the magnetic block 522 and the Hall element 512 are totally aligned, that is, the display panel stops at a specific position.

In this embodiment, in addition to achieving the technical effect of the above embodiment, during the stretching and shrinking process of the display panel, the second unit is not in contact with the first unit, the friction and collision are not generated, which facilitates the free movement of the display panel and ensures the uniform stretching and shrinking speed of the display panel.

Figure 17:
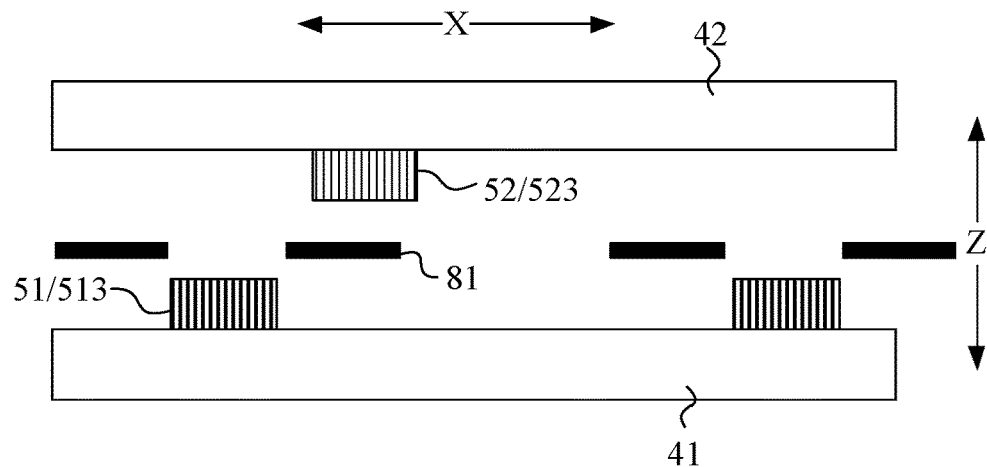
FIG. 17 is a structure diagram of another display device according to an embodiment of the present disclosure.

The embodiment of the present disclosure also provides an implementable mode for implementing the response of the control module to the first unit and the second unit by using a photoelectric component. FIG. 17 is a structure diagram of another display device according to an embodiment of the present disclosure. Referring to FIG. 17, in this display device, the first unit 51 is a photosensitive element 513 and the second unit 52 is a light-emitting element 523; and the photosensitive element 513 changes an output current in response to a position relationship between the photosensitive element 513 and the light-emitting element 523; and a control module is configured to control a working state of the motor-driven module (not shown in the figure) according to the change of the output current.

Similarly, the photosensitive element 513 maintains an electrical connection relationship with the control module 30, and outputs a fixed current signal to the control module 30 in a normal state, that is, in a case where positions of the first unit and the second unit are relatively far away and outgoing light from a light-emitting element 523 cannot be sensed. In a case where positions of the light-emitting element 523 and the photosensitive element 513 are relatively close to a set distance range, the photosensitive element 512 may sense stronger light emitted from the light-emitting element 523, thereby generating different induced currents. The control module 30 may perform feedback and control on the motor-driven module according to this varying induced current. The following is an example of a control circuit between the photosensitive element and the control module as well as the motor-driven module. In an embodiment, two terminals of the photosensitive element are respectively connected to two input terminals of the control module, and an output terminal of the control module is connected to the motor-driven module. The photosensitive element generates a current in response to a light intensity of the light-emitting element. After receiving the current signal, the two input terminals of the control module may provide a first control signal to the motor-driven module.

Similarly, a photoelectric response between the photosensitive element 512 and the light-emitting element 523 merely needs to meet a requirement of a certain distance, so there is no need to configure the photosensitive element 512 to be in contact with the light-emitting element 523. To make the control module 30 respond to the feedback in a case where the photosensitive element 512 is aligned with the light-emitting element 523, a black light-shielding structure 81 may be disposed on a side of the photosensitive element 512 close to the light-emitting element 523 as shown in FIG. 14 so as to ensure that in a case where the light-emitting element 523 moves to be aligned with the photosensitive element 512, light of the light-emitting element 523 irradiates the photosensitive element 512, in this case, the photosensitive element 512 has an obvious current change, so that the control module 30 performs accurate feedback and control.

In this embodiment, in addition to achieving the technical effect of the above embodiment, during the stretching and shrinking process of the display panel, the second unit is not in contact with the first unit, the friction and collision are not generated, which facilitates the free movement of the display panel and ensures the uniform stretching and shrinking speed of the display panel.

Figure 18:
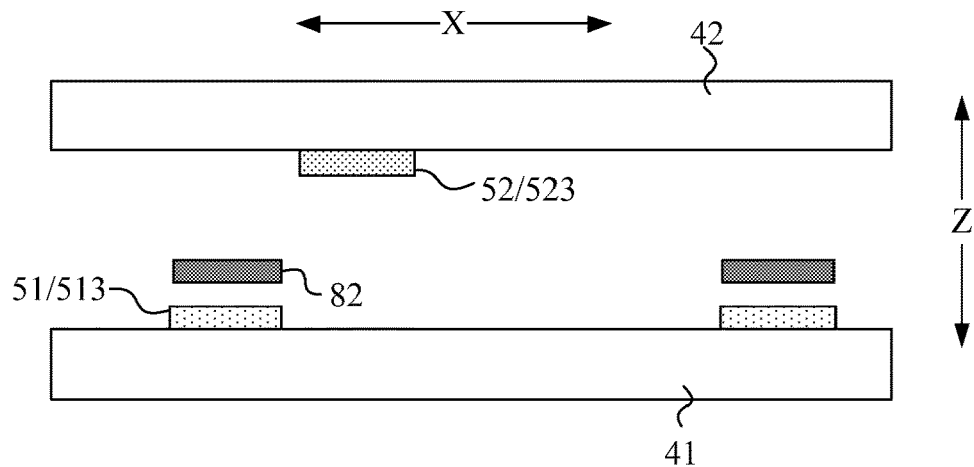
FIG. 18 is a structure diagram of another display device according to an embodiment of the present disclosure.

The embodiment of the present disclosure also provides an implementable mode for implementing the response of the control module to the first unit and the second unit by using a capacitive component. FIG. 18 is a structure diagram of another display device according to an embodiment of the present disclosure. Referring to FIG. 18, in this display device, the first unit 51 is a first capacitive plate 514 and the second unit 52 is a second capacitive plate 524; and the first capacitive plate 514 changes a voltage in response to a position relationship between the first capacitive plate 514 and the second capacitive plate 524; and the control module controls a working state of the motor-driven module (not shown in the figure) in response to the change of the voltage of the first capacitive plate.

Similarly, in this embodiment, the first capacitive plate 514 maintains the electrical connection with the control module 30. In a normal state, positions of the first capacitive plate 514 and the second capacitive plate 524 are far away from each other, and a voltage signal cannot be effectively changed on the first capacitive plate 514, so the control module 30 receives the relatively stable voltage signal. The positions of the second capacitive plate 524 and the first capacitive plate 514 are relatively close to a set distance range, the first capacitive plate 514 can sense the second capacitive plate 524, charges stored on the first capacitive plate 524 change, and a voltage on the first capacitive plate 514 changes. The control module 30 may perform feedback and control on the motor-driven module according to the change of the output voltage. The following is an example of a control circuit between the first capacitive plate 514 and the control module as well as the motor-driven module. In an embodiment, the first capacitive plate is directly connected to an input terminal of the control module, and an output terminal of the control module is connected to the motor-driven module. The first capacitive plate changes the accumulated charges in response to the position of the second capacitive plate, thereby providing the voltage signal for the input terminal of the control module, and the control module provides a first control signal for the motor-driven module in response to the voltage signal.

Similarly, a capacitive response between the first capacitive plate 514 and the second capacitive plate 524 merely needs to meet a requirement of a certain distance, so there is no need to configure the first capacitive plate 514 to be in contact with the second capacitive plate 524. To accurately detect and precisely control a stretching and shrinking position of the display panel, in this embodiment, the control module needs to sensitively detect the change of the output voltage generated by the first capacitive plate 514 so as to identify the output voltage in a case where the first capacitive plate 514 and the second capacitive plate 524 are totally aligned, thereby feedbacking and controlling the motor-driven module so as to stop the first capacitive plate 514 and the second capacitive plate 524 in the case where the first capacitive plate 514 and the second capacitive plate 524 are totally aligned. In an embodiment, on a side of the first capacitive plate 514 facing the second capacitive plate 524, a dielectric 82 with an appropriate dielectric constant may be provided to increase a capacitance between the first capacitive plate 514 and the second capacitive plate 524, increasing the change amount of the charges stored on the plates, thereby increasing the change range of the output voltage and ensuring that the control module accurately identifies the position change of the first capacitive plate 514 and the second capacitive plate 524. In this embodiment, in addition to achieving the technical effect of the above embodiment, during the stretching and shrinking process of the display panel, the second unit is not in contact with the first unit, the friction and collision are not generated, which facilitates the free movement of the display panel and ensures the uniform stretching and shrinking speed of the display panel.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A display device, comprising:
   a display panel;
   a motor-driven module, which is configured to be connected to the display panel and drive the display panel to move;
   a control module, which is configured to control the motor-driven module;
   a first module and a second module disposed opposite to each other in a first direction, wherein the first module and the second module are able to move relatively in a second direction;
   a first unit, which is disposed on a side of the first module facing the second module; and
   a second unit, which is disposed on a side of the second module facing the first module;
   wherein in response to a position relationship between the first unit and the second unit, the control module provides a first control signal for the motor-driven module, and
   wherein the first direction intersects the second direction;
   wherein the first unit is a first capacitive plate and the second unit is a second capacitive plate; and
   wherein a voltage of the first capacitive plate changes in response to a position relationship between the first capacitive plate and the second capacitive plate; and the control module controls a working state of the motor-driven module in response to a change of the voltage of the first capacitive plate.

2. The display device of claim 1, wherein the display panel comprises a first terminal and a second terminal opposite to each other, the first terminal is fixed to the motor-driven module, and a relative position of the second terminal and the second module is fixed; and
   a relative position of the first module and the motor-driven module is fixed.

3. The display device of claim 2, wherein the display panel is able to be stretched in the second direction.

4. The display device of claim 1, wherein the motor-driven module comprises a reel and a motor, an axis of the reel is perpendicular to the first direction and the second direction, and at least part of the display panel is able to be winded on the reel.

5. The display device of claim 1, further comprising: a first housing and a second housing; wherein the first housing and the second housing are slidably connected to each other and slide relatively in the second direction; and wherein the motor-driven module and the first module are accommodated in the first housing; and the second module is accommodated in the second housing.

6. The display device of claim 5, wherein the second housing comprises a second backplate and a side wall away from a side of the first housing, wherein the second module is parallel to the second backplate and is connected to the second backplate through the side wall, and the second module is configured to support the display panel; and wherein the first module is located between the second module and the second backplate and is fixedly connected to the first housing.

7. The display device of claim 1, wherein the first unit is a key switch, a side of the first unit facing the second unit is provided with a first protrusion structure, a side of the second unit facing the first unit is provided with a second protrusion structure, and in a case where the second unit moves to be in contact with the first unit, the first protrusion structure and the second protrusion structure press against each other to cause the key switch to be turned on or turned off.

8. The display device of claim 7, wherein the first unit further comprises an elastic member located on a side of the first protrusion structure facing away from the second protrusion structure, and wherein the elastic member is in contact with the first protrusion structure and has elasticity in the first direction.

9. The display device of claim 8, comprising at least two first units; wherein the second unit is located between the at least two first units, two sides of the second protrusion structure in the second direction are respectively provided with a second inclined surface, wherein the two sides of the second protrusion structure are facing away from each other and the second inclined surfaces on the two sides of the second protrusion structure are symmetrical to each other; an intersection point of extension lines of two second inclined surfaces of the second protrusion structure is located on the side of the second unit facing the first unit; and the second protrusion structure further comprises a top surface facing a side of the first protrusion structure, wherein the top surface is parallel to the second direction, the two second inclined surfaces are connected through a cambered surface, the top surface and a cambered surface sequentially.

10. The display device of claim 1, comprising at least two unit groups, wherein each unit group of the at least two unit groups comprises at least one second unit and at least two first units; and in a same unit group, the at least two first units and the at least one second unit are alternately arranged in the second direction.

11. The display device of claim 1, wherein the first control signal is a brake signal for braking the motor-driven module.

12. A display device, comprising:
a display panel;
a motor-driven module, which is configured to be connected to the display panel and drive the display panel to move;
a control module, which is configured to control the motor-driven module;
a first module and a second module disposed opposite to each other in a first direction, wherein the first module and the second module are able to move relatively in a second direction;
a first unit, which is disposed on a side of the first module facing the second module; and
a second unit, which is disposed on a side of the second module facing the first module;

wherein in response to a position relationship between the first unit and the second unit, the control module provides a first control signal for the motor-driven module, and
wherein the first direction intersects the second direction; the display device further comprise: a first housing and a second housing; wherein the first housing and the second housing are slidably connected to each other and slide relatively in the second direction; and wherein the motor-driven module and the first module are accommodated in the first housing; and the second module is accommodated in the second housing;
wherein the second housing comprises a second backplate and a side wall away from a side of the first housing, wherein the second module is parallel to the second backplate and is connected to the second backplate through the side wall, and the second module is configured to support the display panel; and wherein the first module is located between the second module and the second backplate and is fixedly connected to the first housing; and
wherein the display device further comprises: a first support plate fixed to the first housing;
in a direction of a thickness of the display device, the first support plate is a first comb structure, the second module is a second comb structure, the first comb structure meshes with the second comb structure, and the second module and the first support plate are able to support the display panel jointly,
wherein the first module is a circuit board.

13. The display device of claim 1, wherein the first unit comprises a switch structure, and the second unit controls a switch state of the first unit by changing the position relationship between the second unit and the first unit, so as to control the control module to provide the first control signal to the motor-driven module.

14. The display device of claim 13, wherein in a case where the first unit is in contact with the second unit, the switch structure is turned on, and a second control signal is transmitted to the control module through the switch structure to cause the control module to generate the first control signal to the motor-driven module.

15. The display device of claim 14, wherein the first module comprises a high-voltage power supply terminal and a ground terminal; the first unit is connected in series between the high-voltage power supply terminal and the ground terminal;
wherein the display device comprises one of that: an input terminal of the control module is electrically connected between the high-voltage power supply terminal and the first unit, and the second control signal is a high voltage; or the input terminal of the control module is electrically connected between the ground terminal and the first unit, and the second control signal is a grounding voltage; and
wherein the display device comprises that an output terminal of the control module is electrically connected to the motor-driven module.

16. A display device, comprising:
a display panel;
a motor-driven module, which is configured to be connected to the display panel and drive the display panel to move;
a control module, which is configured to control the motor-driven module;

a first module and a second module disposed opposite to each other in a first direction, wherein the first module and the second module are able to move relatively in a second direction;

a first unit, which is disposed on a side of the first module facing the second module; and a second unit, which is disposed on a side of the second module facing the first module;

wherein in response to a position relationship between the first unit and the second unit, the control module provides a first control signal for the motor-driven module, wherein the first direction intersects the second direction;

wherein the first unit is a key switch, a side of the first unit facing the second unit is provided with a first protrusion structure, a side of the second unit facing the first unit is provided with a second protrusion structure, and in a case where the second unit moves to be in contact with the first unit, the first protrusion structure and the second protrusion structure press against each other to cause the key switch to be turned on or turned off;

wherein the first unit further comprises an elastic member located on a side of the first protrusion structure facing away from the second protrusion structure, and wherein the elastic member is in contact with the first protrusion structure and has elasticity in the first direction; and wherein a side of the first protrusion structure facing the second protrusion structure is an inclined surface; in a direction from the first module pointing to the second module, the inclined surface is inclined along a side facing away from the second protrusion structure.

17. The display device of claim 16, wherein two sides of the first protrusion structure in the second direction are respectively provided with a first inclined surface, wherein the two sides of the first protrusion structure are facing away from each other and the first inclined surfaces on the two sides of the first protrusion structure are symmetrical to each other; an intersection point of extension lines of two first inclined surfaces of the first protrusion structure is located on the side of the first unit facing the second unit; and the two first inclined surfaces are connected through a cambered surface, wherein the cambered surface protrudes facing the second unit.

* * * * *